Patented Apr. 7, 1931

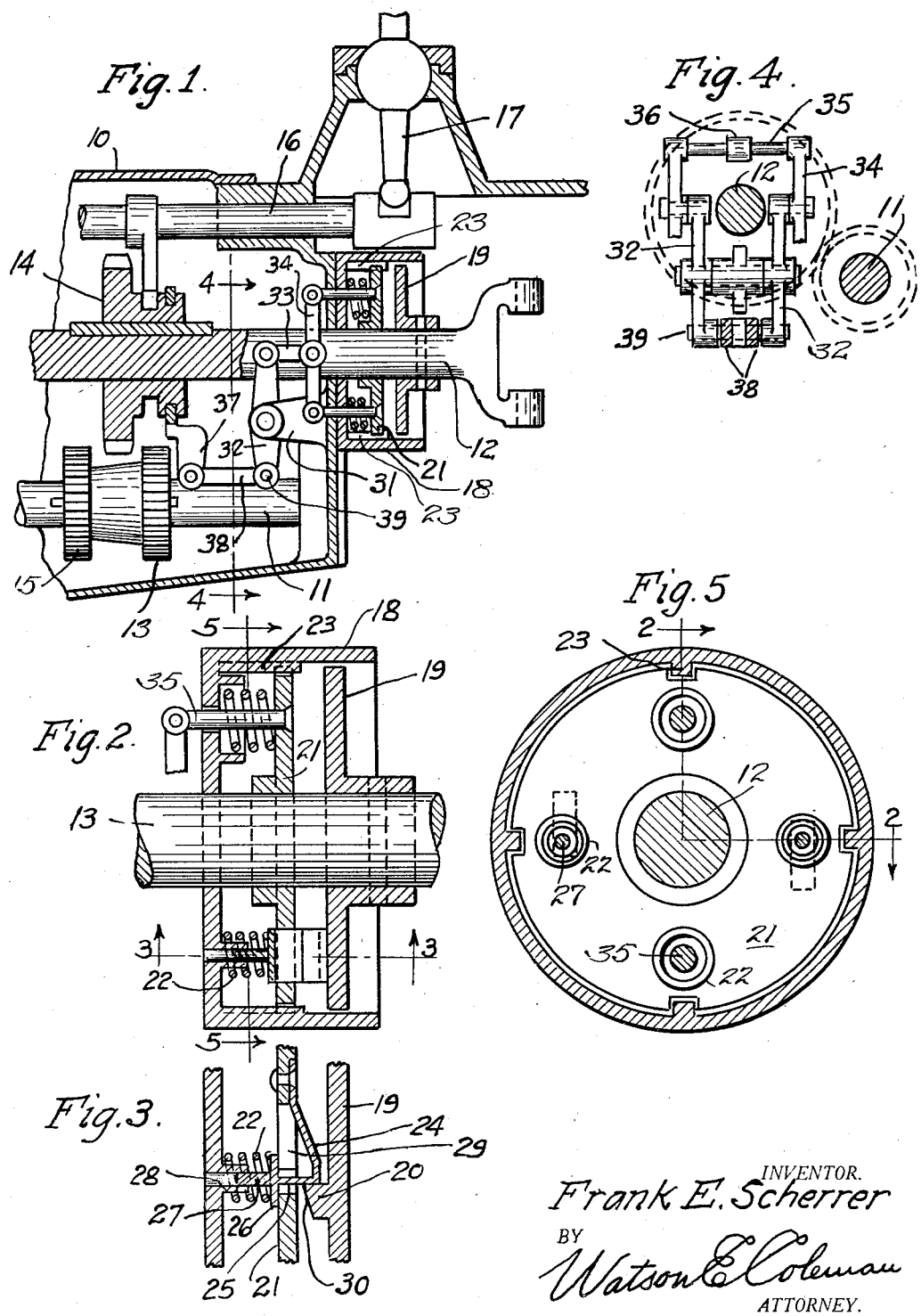

1,799,708

UNITED STATES PATENT OFFICE

FRANK E. SCHERRER, OF DENVER, COLORADO

REVERSE-ROTATION-PREVENTING DEVICE

Application filed April 2, 1929. Serial No. 351,975.

This invention relates to a reverse rotation preventing device, and more particularly to an attachment for the transmissions of automobiles.

An important object of the invention is to provide an apparatus which will be effective at all times to prevent reverse rotation of the output shaft of the transmission except when the reverse gearing of the transmission is in use and which will thus serve as an efficient means preventing retrogressive movement of the vehicle during gear changing periods when the vehicle is on a steep declevity and which will further act to prevent reverse motion of a vehicle when left standing upon a declivity.

A further object of the invention is the provision of novel and improved means whereby operation of this reverse preventing apparatus may be obtained directly by the operation of the gearing of the transmission and without any specific attention on the part of the operator.

A still further object of the invention is to provide an apparatus of this character which may be combined in the construction of the present day transmissions with but slight modifications thereof.

These and other objects I attain by the construction shown in the accompanying drawing, wherein for the purpose of illustration is shown a preferred embodiment of my invention and wherein:—

Figure 1 is a sectional view through a portion of a transmission and through a reverse motion preventing device constructed and operating in accordance with my invention;

Figure 2 is a section on the line 2—2 of Figure 5;

Figure 3 is a section on the line 3—3 of Figure 2;

Figure 4 is a section on the line 4—4 of Figure 1;

Figure 5 is a section on the line 5—5 of Figure 2.

Referring now more particularly to the drawings, the numeral 10 generally designates the casing of a transmission, 11 the pony shaft thereof, 12 the output shaft, 13 a reversing idler, 14 a shiftable gear upon the output shaft for selectively engaging either the reversing idler or a gear 15 secured to the shaft 11, 16 the shift rods controlling the operation of the gear 14, and 17 the usual lever for controlling the operation of the shift rods. The parts just recited are normal parts of the usual transmission and may occupy the same positions in the transmission as they normally occuy, if so desired.

In accordance with my invention, I provide a casing 18 surrounding the output shaft 12 which is at present disclosed as disposed at the rear end of the transmission casing 10 and secured thereto.

Within this casing, I secure to the shaft 12 a disk 19 having projecting outwardly therefrom a circumferential series of lugs 20. I slidably mount upon the shaft within the casing a second disk 21 which is spring-urged toward the disk 19 by springs 22. This disk is furthermore splined to the casing 18, as indicated at 23, so that it may not rotate with relation thereto.

Secured to the disk 21 are spring latches 24, each in the form of a spring strip having one end thereof secured to the disk and normally inclining outwardly from this disk toward the disk 19. The terminals of these strips have angular portions 25 projected through the disk 21 and provided with enlarged heads 26 from which extend guide pins 27. The guide pins 27 operate in the bores of tubular bosses 28 which may form guide posts for the springs 22. The ends of these springs engage the heads 26 with the result that these springs serve not only to move the disk 21 toward the disk 19 but likewise to maintain the projection of the spring latches 24. The spring latches 24 are preferably disposed at recesses 29 formed in the disk 21, so that they may recede to a point where they are flush with this disk and do not project therebeyond.

It will be obvious that during rotation of the disk 21 in one direction, the spring catches 24 will yield by their engagement with the cam noses 30 of the lugs 20 and will recede into their respective recesses to permit passage of the lug. This action takes place when the shaft 12 is rotating in a direction causing progressive movement of the vehicle.

During reverse rotation of the shaft 12 however, the lugs 20 will engage the ends of the spring catches and thus positively prevent such reverse rotation except under conditions hereinafter described.

Within the transmission casing 10, I provide a suitable support 31 upon which I pivot levers 32 which are arranged at opposite sides of the shaft 12. These levers are connected by links 33 with connecting bars 34 to the ends of which are connected shafts 35 upon which are mounted rods 36 projecting through the rear wall of the transmission casing and the forward wall of the casing 18. Within this casing, they are secured to the disk 21, and it will be obvious that upon movement of the lower ends of the levers 32 toward the rear wall of the transmission casing, the disk 21 will be shifted forwardly and the spring catches 24 moved out of the path of the lugs 20, so that reverse rotation of the shaft 13 may take place.

To provide this movement of the levers, I loosely connected, as at 37ª, to the movable gear 14, an arm 37 which is connected by a link 38 to a shaft 39 connecting the lower ends of the levers 32. The movable gear 14, when shifted to engage the reverse idler 13, shifts toward the rear end of the transmission casing, and through the connections just described transmits a similar motion to the lower ends of the levers 32.

It will be obvious that a construction of this character may be readily formed as an attachment to or combined in the construction of the ordinary transmission without any material change in the arrangement thereof.

Link 38 should have a slotted engagement with the shaft 39, which permits the gear 14 to be shifted in one direction without an operation causing movement of the disc 21, so that the gear 14 can perform its usual function as a control gear for both the low and reverse speeds of the transmission. It is well known that in the usual transmission this construction is employed, the control gear shifting in opposite directions to establish low speed and reverse operations of the output shaft.

It will also be obvious that the construction hereinbefore set forth is capable of a certain range of change and modification and I accordingly do not limit myself thereto except as hereinafter claimed.

I claim:—

1. In means for preventing reverse rotation of the output shafts of transmissions, a fixed housing through which the output shaft of the transmission is passed, a disc secured to the output shaft within said housing, a second disc fixed against rotation with relation to the housing, the first named disc having ratchet lugs projecting therefrom, the last named disc having spring latches for coaction with said lugs, the ends of said latches having extensions projected through openings in the second disc and provided at the opposite side of the second disc from the faces of said second disc with heads limiting projection of said latches from said second disc.

2. In means for preventing reverse rotation of the output shafts of transmissions, a fixed housing through which the output shaft of the transmission is passed, a disc secured to the output shaft within said housing, a second disc fixed against rotation with relation to the housing, the first named disc having ratchet lugs projecting therefrom, the last named disc having spring latches for coaction with said lugs, the ends of said latches having extensions projected through openings in the second disc and provided at the opposite side of the second disc from the faces of said second disc with heads limiting projection of said latches from said second disc, said second disc being movable toward and away from the first named disc, and springs urging said second disc toward the first named disc and engaging said heads to urge the spring latches toward the second named disc.

3. In means for preventing reverse rotation of the output shafts of transmissions, a fixed housing through which the output shaft of the transmission is passed, a disc secured to the output shaft within said housing, a second disc fixed against rotation with relation to the housing, the first named disc having ratchet lugs projecting therefrom, the last named disc having spring latches for coaction with said lugs, the ends of said latches having extensions projected through openings in the second disc and provided at the opposite side of the second disc from the faces of said second disc with heads limiting projection of said latches from said second disc, said second disc being movable toward and away from the first named disc, springs urging said second disc toward the first named disc and engaging said heads to urge the spring latches toward the second named disc, and means for withdrawing the second named disc from the first named disc through a distance sufficient to provide clearness between the latches of the second disc and the lugs of the first disc.

4. In means for preventing reverse rotation of the output shafts of transmissions which include a member reversely shiftable to establish low speed and reverse operations of the output shaft, comprising a fixed housing through which the output shaft of the transmission is passed, a disc secured to the output shaft within said housing, a second disc fixed against rotation with relation to the housing and shiftable longitudinally therein, coacting ratchet means carried by said discs and when engaged preventing rotation of the first named disc in a direction permitting rotation of said output shaft, connections between said reversely shiftable member and said disc whereby said second disc is withdrawn to cause disengagement of said ratchet means when said reversely shiftable member is positioned to establish reverse rotation of the shaft.

5. In means for preventing reverse rotation of the output shafts of transmissions which include a member reversely shiftable to establish low speed and reverse operations of the output shaft, comprising a fixed housing through which the output shaft of the transmission is passed, a disc secured to the output shaft within said housing, a second disc fixed against rotation with relation to the housing and shiftable longitudinally therein, coacting ratchet means carried by said discs and when engaged preventing rotation of the first named disc in a direction permitting rotation of said output shaft, connections between said reversely shiftable member and said disc whereby said second disc is withdrawn to cause disengagement of said ratchet means when said reversely shiftable member is positioned to establish reverse rotation of the shaft, said connections being inoperative to shift the second disc toward the first named disc, and springs constantly urging the second disc toward the first named disc.

In testimony whereof I hereunto affix my signature.

FRANK E. SCHERRER.